E. Waugaman,
Cider Mill and Press.
No 80,253.        Patented July 21, 1868.
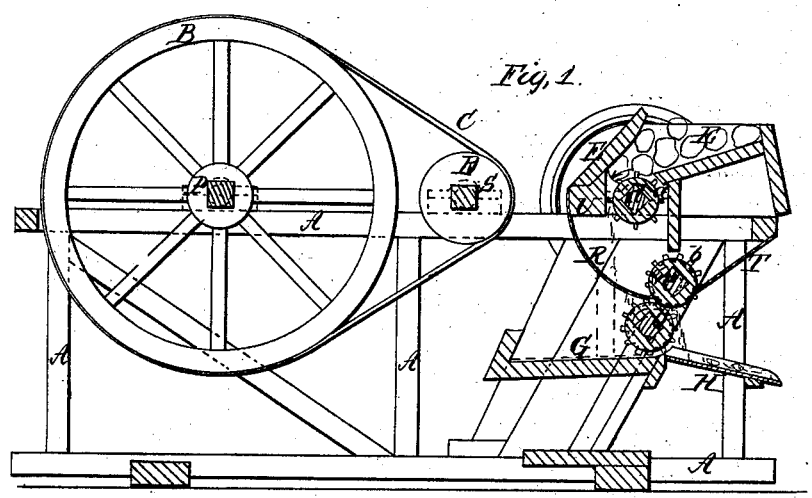
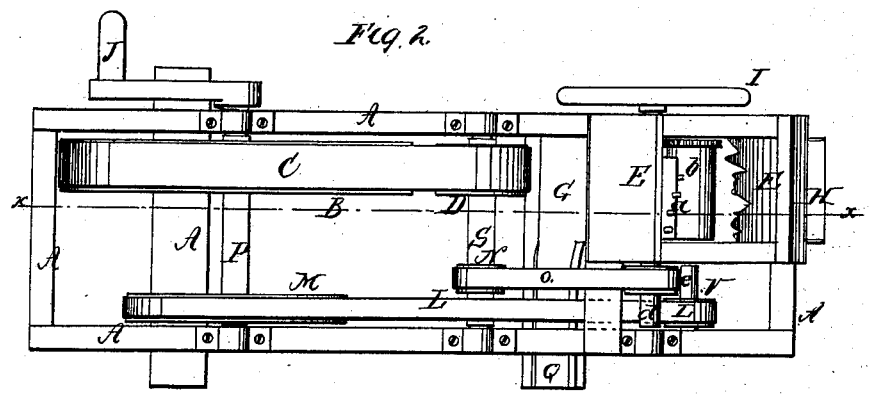
Witnesses,
Wm A. Morgan
G. C. Cotton
Inventor,
Eli Waugaman
per Munn & Co
Attorneys

United States Patent Office.

ELI WAUGAMAN, OF BLAIRSVILLE, PENNSYLVANIA.

Letters Patent No. 80,253, dated July 21, 1868.

COMBINED CIDER-MILL AND PRESS.

The Schedule referred to in these Letters Patent and making part of the same.

TO ALL WHOM IT MAY CONCERN:

Be it known that I, ELI WAUGAMAN, of Blairsville, in the county of Indiana, and State of Pennsylvania, have invented a new and improved Combined Cider-Mill and Press; and I do hereby declare that the following is a full, clear, and exact description thereof, which will enable others skilled in the art to make and use the same, reference being had to the accompanying drawings, forming part of this specification.

Figure 1 is a vertical longitudinal section of my invention, the section being taken through the line $x\,x$ of fig. 2, which latter is a top view of the same.

The object of this invention is to combine grinding and pressing-mechanism in the same general machine, whereby apples and other fruit may be ground, and the juice of the same expressed immediately, by conveying the pomace or must from the grinding-mechanism to the pressing-rollers, located at some point in the frame conveniently below.

Other devices, perfecting the whole, render this invention portable and effective for the purpose designed.

A A is the general frame of the machine. B is the main drive-wheel, on a shaft, P, provided with a hand-crank, J, or belt-pulley, when the machine is to be driven by horse, steam, or water-power. The belt C drives a pulley, D, on the shaft S, which shaft also bears another pulley, N, driving a belt, O, on a pulley on the shaft $d$ of the grinding-roller $a$, which roller is located in the bottom opening of the chute E E, in which the fruit is placed.

The fruit is ground or crushed by means of teeth or asperities on the roller $a$, which reduces it to the state of pomace or must as it is drawn in and pressed against the part U of the chute, from whence it falls upon the curved and perforated sheet of metal R, which allows the juice to pass through upon the sloping box G, from whence it flows off through the gutter Q, forming part of the box, and is caught in a vessel placed under the end of the gutter.

The pomace or must is conveyed upon the inclined and curved sheet R to the press-rollers $b\,b$, which are provided with cog-teeth at their ends for revolving together, and motion is transmitted to the upper roller by a belt, L, running on the pulleys M and V, the former being on the shaft P, and the latter on the shaft $e$ of the upper roller $b$. The juice falls down upon the bottom of the box G, and mingles with that falling through the sheet R.

A chute, H, conducts off the expressed pomace, which passes through the rollers and falls upon the said chute, as shown in red.

The bottom of the box G extends under the lower roller, and is inclined downward, thus conducting to the gutter Q the juice that passes down in front or behind the lower roller.

A plate, T, serves to partially enclose the upper roller $b$.

I is the fly-wheel, in the shaft of the roller $a$.

I claim as new, and desire to secure by Letters Patent—

1. The rollers $a$, $b\,b$, perforated sheet R, box G, chutes E E and H, arranged substantially as shown and described, within a frame, A A A, &c., and operated in the manner substantially as herein set forth.

2. The arrangement, herein shown and described, upon the frame A, and with relation to the grinding and pressing-mechanism of the drive-wheel B, shafts P S, pulleys M D N V, and belts C L O, all as herein set forth.

ELI WAUGAMAN.

Witnesses:
R. D. WALKINSHAW,
W. M. BAIRD.